United States Patent [19]

Boeckh et al.

[11] Patent Number: 5,777,046

[45] Date of Patent: Jul. 7, 1998

[54] AMPHIPHILIC POLYESTERS, PREPARATION THEREOF, AND USE THEREOF IN LAUNDRY DETERGENTS

[75] Inventors: Dieter Boeckh, Limburgerhof; Hans-Ulrich Jäger, Neustadt; Gunnar Schornick, Neuleiningen, all of Germany

[73] Assignee: BASF Aktiengesellschaft, Ludwigshafen, Germany

[21] Appl. No.: 687,322

[22] PCT Filed: Jan. 28, 1995

[86] PCT No.: PCT/EP95/00300

§ 371 Date: Aug. 5, 1996

§ 102(e) Date: Aug. 5, 1996

[87] PCT Pub. No.: WO95/21880

PCT Pub. Date: Aug. 17, 1995

[30] Foreign Application Priority Data

Feb. 8, 1994 [DE] Germany .................. 44 03 866.6

[51] Int. Cl.$^6$ ................................................. C08F 20/00

[52] U.S. Cl. .................. 525/444; 528/271; 528/272; 528/300; 528/302; 528/306; 528/308; 528/308.6; 528/361; 525/444; 252/174.23

[58] Field of Search .................. 528/271, 272, 528/300, 302, 306, 308, 308.6, 361; 525/444; 252/174.23

[56] References Cited

U.S. PATENT DOCUMENTS

| | | |
|---|---|---|
| 3,083,187 | 3/1963 | Stuart et al. |
| 3,310,512 | 3/1967 | Curtice |
| 3,557,039 | 1/1971 | McIntyre et al. |
| 4,702,857 | 10/1987 | Gosselink .................. 252/174.21 |
| 4,713,194 | 12/1987 | Gosselink .................. 252/174.23 |
| 4,861,512 | 8/1989 | Gosselink .................. 252/174.23 |
| 5,142,020 | 8/1992 | Kud et al. |

FOREIGN PATENT DOCUMENTS

| | | |
|---|---|---|
| 0 110 267 | 6/1984 | European Pat. Off. |
| 0 185 427 B1 | 12/1985 | European Pat. Off. |
| 0 241 985 | 6/1987 | European Pat. Off. |
| 0 272 033 | 8/1987 | European Pat. Off. |
| 0 241 984 | 10/1987 | European Pat. Off. |
| 1154730 | 9/1966 | United Kingdom |

OTHER PUBLICATIONS

Polymer Bulletin, vol. 17, 499–506 (1987).

*Primary Examiner*—Samuel A. Acquah
*Attorney, Agent, or Firm*—Oblon, Spivak, McClelland, Maier & Neustadt, P.C.

[57] ABSTRACT

Amphiphilic polyesters containing
  (a) ester units derived from polyalkylene glycols having a molecular weight of from 500 to 7500 and aliphatic dicarboxylic acids and/or monohydroxymonocarboxylic acids and
  (b) ester units derived from aromatic dicarboxylic acids and polyhydric alcohols
and having molecular weights of from 1500 to 25,000, processes for preparing the amphiphilic polyesters by polycondensation, preparing first
  (a) aliphatic polyesters of polyalkylene glycols having a molecular weight of from 500 to 7500 with aliphatic dicarboxylic acids and/or monohydroxymonocarboxylic acids and then, within the aliphatic polyester thus obtained,
  (b) aromatic polyesters from aromatic dicarboxylic acids and polyhydric alcohols,
reversing the order of the polycondensation, or condensing oligomeric aromatic polyesters (b) with oligomeric aliphatic polyesters (a), and use of the amphiphilic polyesters as additive in laundry detergents, other laundry detergent additives and laundry aftertreatments.

7 Claims, No Drawings

AMPHIPHILIC POLYESTERS, PREPARATION THEREOF, AND USE THEREOF IN LAUNDRY DETERGENTS

The present invention relates to amphiphilic polyesters, processes for preparing them, and their use as additive in laundry detergents and laundry aftertreatments.

U.S. Pat. No. 3,557,039 discloses stable aqueous dispersions of polymers preparable by condensation of terephthalic acid or dimethyl terephthalate with ethylene glycol and polyethylene glycol having an average molecular weight of from 1000 to 4000. The molar ratio of ethylene terephthalate to polyethylene glycol terephthalate units is within the range from 2:1 to 6:1. The dispersions are used for treating the surfaces of polyester articles.

GB-A1 154 730 discloses reducing soil redeposition in the washing of textile material by adding to the wash liquor, which contains a detergent, polycondensates containing either repeating ester or amide units. These additives are for example condensation products known from the above-cited U.S. Pat. No. 3,557,039 and are obtainable by condensation of dimethyl terephthalate, ethylene glycol and polyethylene glycol having a molecular weight of 1500.

EP Applications 185 427, 241 984, 241 985 and 272 033 disclose polyester condensates of polybasic aromatic carboxylic acids with dihydric alcohols and one-sidedly $C_1$14 $C_4$-capped polyethers, which promote soil release from polyester fabrics. These polyesters have hydrophilic end groups which, in the cited applications, are mentioned as the basis of the soil-releasing properties of the polyesters.

Amphiphilic polyesters of aliphatic polybasic carboxylic acids and/or monohydroxymonocarboxylic acids with polyethylene glycol are described for example in Polymer Bulletin, Volume 17, 499–506 (1987).

U.S. Pat. No. 5,142,020 discloses amphiphilic polyesters obtainable by condensation of (a) carboxylic acids having at least 2 carboxyl groups, their esters, anhydrides or mixtures, (b) at least dihydric alcohols and/or addition products of from 1 to 5 mol of at least one alkylene oxide having 2 or 3 carbon atoms with 1 mol of an at least dihydric alcohol or mixtures and (c) water-soluble addition products of from 5 to 80 mol of at least one alkylene oxide with 1 mol of $C_8$–$C_{24}$-alcohols, $C_8$–$C_{18}$-alkylphenols or $C_8$–$C_{24}$-alkylamines in a molar ratio of (a):(b):(c) of 100:(from 25 to 2500):(from 5 to 110) at temperatures of at least 120° C. to weight average molecular weights of from 2000 to 50,000. The polyesters are used as grayness-inhibiting and soil-release additive in pulverulent and liquid laundry detergents.

It is an object of the present invention to provide novel substances and laundry detergent additives.

We have found that this object is achieved by amphiphilic polyesters containing (a) ester units derived from polyalkylene glycols having a molecular weight of from 500 to 7500 and aliphatic dicarboxylic acids and/or monohydroxymonocarboxylic acids and (b) ester units derived from aromatic dicarboxylic acids and polyhydric alcohols and having molecular weights of from 1500 to 25,000.

The amphiphilic polyesters are obtained by polycondensing to prepare first (a) aliphatic polyesters of polyalkylene glycols having a molecular weight of from 500 to 7500 with aliphatic dicarboxylic acids and/or monohydroxymonocarboxylic acids and then, within the aliphatic polyester thus obtained, (b) aromatic polyesters from aromatic dicarboxylic acids and polyhydric alcohols, reversing the order of the polycondensation, or condensing oligomeric aromatic polyesters (b) with oligomeric aliphatic polyesters (a).

The above-described amphiphilic polyesters are used as additive in laundry detergents, other laundry detergent additives and laundry aftertreatments.

The amphiphilic polyesters having ester units derived from (a) polyalkylene glycols and aliphatic dicarboxylic acids and/or monohydroxymonocarboxylic acids (hereinafter called "aliphatic block") and (b) aromatic dicarboxylic acids and polyhydric alcohols (hereinafter called "aromatic block") have soil-release properties in wash liquors and are very readily biodegradable.

The aliphatic blocks (a) are prepared by polycondensation of polyalkylene glycols having a molecular weight of from 500 to 7500 with aliphatic dicarboxylic acids and/or monohydroxy-monocarboxylic acids in a conventional manner. The polycondensation is carried out for example at temperatures of at least 120° C., preferably within the temperature range from 150° to 260° C., in the presence of customary polycondensation or transesterification catalysts. Typically, the reaction participants are condensed in an inert gas atmosphere in the presence or absence of further additives, such as antioxidants. Such processes are known for example from U.S. Pat. No. 3,557,039 mentioned at the beginning.

Suitable catalysts include all compounds described in the literature for this purpose. When the free polycarboxylic acids or the anhydrides are used in the condensation, p-toluenesulfonic acid is the preferred catalyst. When dialkyl dicarboxylates or polycarboxylic esters are used, the customary transesterification catalysts are used, such as, for example, zinc acetate, mixtures of calcium acetate and antimony oxide or tetraalkoxytitanates, such as titanium tetraisobutoxide or titanium tetraisopropoxide. Other preferred catalysts are for example carbonates, acetates and/or $C_1$–$C_4$-alkoxylates of lithium, sodium, magnesium, cobalt, manganese, vanadium, titanium and tin and also tin oxides. The catalysts are generally used in amounts of from 20 to 5000, preferably from 50 to 2000, ppm, based on the components used in the condensation.

The condensation can be carried out in the presence of anti-oxidants, for example substituted phenols, such as, for example, 2,5-di-tert-butylphenol, 2-methylcyclohexyl-4,6-dimethylphenol, 2,6-di-tert-butyl-4-methylphenol, pyrogallol, phosphorus acid or other antioxidants customary for this purpose. These compounds prevent discoloration of the polyesters due to oxidation during the condensation.

Suitable polyalkylene glycols for preparing the aliphatic blocks (a) have number average molecular weights of from 500 to 7500, preferably from 1000 to 4500. The polyalkylene glycols are water-soluble. They are preferably derived from ethylene oxide, propylene oxide, n-butylene oxide or isobutylene oxide and are prepared for example by addition of the alkylene oxides to dihydric alcohols. This can be done for example by adding only ethylene oxide or propylene oxide to a dihydric alcohol, such as ethylene glycol or propylene glycol, or by preparing block copolymers by first adding ethylene oxide and then propylene oxide to a dihydric alcohol or vice versa. In the preparation of the polyalkylene glycols, propylene oxide, for example, may be wholly or partly replaced by a butylene oxide. Similarly, random polyalkylene oxides obtainable by addition of a mixed gas of at least two alkylene oxides to a dihydric alcohol can be used as polyalkylene glycols in the preparation of the aliphatic blocks (a). The preferred polyalkylene glycols are ethylene glycol, propylene glycol and block copolymers of ethylene oxide and propylene oxide.

Suitable aliphatic dicarboxylic acids contain for example from 2 to 10 carbon atoms. Examples are oxalic acid, malonic acid, succinic acid, glutaric acid, adipic acid, maleic acid, fumaric acid, itaconic acid and citraconic acid. They can be used either alone or mixed, for example as mixtures of oxalic acid and succinic acid or of succinic acid and adipic acid, in the preparation of the aliphatic blocks.

The preparation of the aliphatic blocks of the amphiphilic polyesters may be effected in the additional presence of monohydroxymonocarboxylic acids. A further variant comprises using monohydroxymonocarboxylic acids instead of the aliphatic dicarboxylic acids. The monohydroxymonocarboxylic acids are likewise aliphatic carboxylic acids. Examples are glycolic acid, lactic acid, ω-hydroxystearic acid and ω-hydroxycaproic acid. They can be used individually or mixed in the preparation of the aliphatic blocks.

The aliphatic blocks are preferably prepared by polycondensation of polyethylene glycol with succinic acid or adipic acid. In this preferred variant, the polycondensation may be carried out in the additional presence of ω-hydroxycaproic acid and/or lactic acid.

The aromatic block (b) of the amphiphilic polyesters is obtainable by polycondensation of aromatic dicarboxylic acids with for example aliphatic polyhydric alcohols. The polycondensation is carried out by the same methods as used for preparing the aliphatic blocks (a). The weight average molecular weights of the aromatic blocks (b) are customarily within the range from about 192 to 5000, preferably from about 384 to 1500.

Suitable aromatic dicarboxylic acids include for example terephthalic acid, phthalic acid and sulfoisophthalic acid. The preferred aromatic dicarboxylic acid is terephthalic acid. The dicarboxylic acids may also be used mixed with one another.

Suitable aliphatic polyhydric alcohols include for example ethylene glycol, 1,2-propylene glycol, 1,3-propylene glycol, 1,4-butanediol, 2,3-butanediol, pentanediols, glycerol, pentaerythritol, oligoglycerols having molecular weights of up to 363 and also addition products of from 1 to 5 mol of ethylene oxide and/or propylene oxide with 1 mol of the abovementioned at least dihydric alcohols. Examples of such addition products are ethylene diglycol and propylene diglycol. Also of interest are the addition products of from 1 to 4 mol of ethylene oxide with pentaerythritol, addition products of from 1 to 3 mol of ethylene oxide with 1 mol of glycerol, addition products of from 1 to 3 mol of propylene oxide with 1 mol of glycerol and addition products of from 1 to 5 mol of ethylene oxide and/or propylene oxide with 1 mol of oligoglycerol having from 2 to 5 cocondensed glycerol units.

Preferred polyhydric alcohols are ethylene glycol, propylene glycol, diethylene glycol, dipropylene glycol, 1,4-butanediol, glycerol and pentaerythritol. It is of course also possible to use mixtures of polyhydric alcohols in the preparation of the aromatic blocks (b).

The amphiphilic polyesters have weight average molecular weights of from 1500 to 25,000, preferably from 2500 to 7500. The ratio of the ester units (a):(b) in the amphiphilic polyesters is within the range from 5:1 to 1:2, preferably within the range from 3:1 to 1:1.

The amphiphilic polyesters of the invention can be prepared for example by initially, in a first reaction stage, synthesizing an aromatic block (b) by, for example, condensing terephthalic acid or dimethyl terephthalate with polyhydric alcohols to prepare oligomeric alkylene terephthalates having hydroxy end groups. Such polycondensates are obtained on carrying out the condensation of the starting materials with a molar excess of OH-containing compounds, ie. a molar excess of polyhydric alcohol. The precondensates thus obtainable are then reacted in a second reaction stage with an aliphatic dicarboxylic acid, an ester of a dicarboxylic acid or an anhydride of a dicarboxylic acid (if the dicarboxylic acids can form anhydrides), a water-soluble polyalkylene glycol and optionally a monohydroxycarboxylic acid or ester to form the amphiphilic polyesters of the invention.

However, the reaction of the first stage can also be carried out by, for example, reacting terephthalic acid or dimethyl terephthalate and polyhydric alcohols to prepare oligomeric alkylene terephthalates having carboxy end groups (molar excess of carboxyl groups in the polycondensation) and then reacting these precondensates in a second reaction stage with at least one monohydroxycarboxylic acid or ester to form a polyester which has carboxy end groups from the cocondensed monohydroxycarboxylic acid and which is subsequently reacted with a polyethylene glycol and optionally an aliphatic dicarboxylic acid or ester to form the amphiphilic polyesters.

The use of the monohydroxycarboxylic acid in the condensation is facultative. The stage 1 precondensate having carboxyl end groups can also be reacted directly with at least one polyalkylene glycol and at least one aliphatic dicarboxylic acid.

However, the amphiphilic polyesters of the invention may also be prepared by linking a precondensate having carboxyl end groups, formed for example from terephthalic acid or dimethyl terephthalate and a polyhydric alcohol, with a separately prepared aliphatic block of a water-soluble esterification product of 1 mol of a polyalkylene glycol and 2 mol of a monohydroxycarboxylic acid by esterification. The esterification product may additionally have been reacted with at least one aliphatic dicarboxylic acid.

A further process variant for preparing the polyesters of the invention comprises initially, in a first reaction stage, reacting at least one polyalkylene glycol and at least one aliphatic dicarboxylic acid and optionally at least one monohydroxy-monocarboxylic acid to create a precondensate and, in a second reaction stage, condensing the precondensate with a mixture of at least one polyhydric alcohol and at least one aromatic dicarboxylic acid or ester to form the amphiphilic polyesters of the invention.

In the preparation of the block-structured polycondensates of the invention, the starting materials are used in such a ratio that the weight ratio of the ester units (a):(b) in the polyester products is within the range from 5:1 to 1:2, preferably within the range from 3:1 to 1:1. The amphiphilic polyesters are used as additive in laundry detergents, other laundry detergent additives and laundry aftertreatments. They promote the release of hydrophobic stains in wash liquors, especially in the case of textiles composed of polyester fabric or polyester blend fabrics. Other laundry detergent additives for the purposes of the present invention are to be understood as meaning for example water softeners (e.g. sheet-silicates, polycarboxylates or phosphates) or bleaches. The polyesters to be used according to the invention are particularly effective when the fabric has already been washed or impregnated therewith before becoming stained.

The polyesters of the invention can be present as additive not only in pulverulent but also in liquid laundry detergen formulations. The amounts of polyester used range fo example from 0.05 to 15% by weight, based on the respective formulation. The amphiphilic polyesters are preferably used in phosphate-free and reduced-phosphate laundry detergents or in laundry aftertreatments, such as fabric conditioners. Reduced-phosphate laundry detergents generally include less than 25% by weight of phosphate.

The polyesters of the invention are soluble or dispersible in water. They can be used in the form of an aqueous solution, as dispersion or as powder in the preparation of laundry detergents. A particular advantage of the novel amphiphilic polyesters with block structure is the better biodegradability compared with polyesters of purely aromatic carboxylic acids with otherwise the same construction.

The composition of laundry and cleaner detergent formulations can vary greatly. Laundry and cleaner detergent formulations customarily include from 2 to 50% by weight of surfactants and optionally builders. These figures apply both to liquid and pulverulent laundry detergents. Laundry and cleaner detergent formulations customary in Europe, the U.S. and Japan are shown in table form for example in Chemical and Engn. News, Vol. 67, 35 (1989). Further data about the composition of laundry and cleaner detergents may be found in WO-A-90/13581 and also in Ullmanns Encyklopädie der technischen Chemie, Verlag Chemie, Weinheim 1983, 4th Edition, pages 63–160. Laundry detergents may additionally contain a bleach, for example sodium perborate, which, if used, may be present in the laundry detergent formulation in amounts of up to 30% by weight. Laundry and cleaner detergents may include further customary additives, for example complexing agents, or pacifiers, optical brighteners, enzymes, perfume oils, color transfer inhibitors, grayness inhibitors and/or bleach activators.

The percentages in the examples are by weight. The polymers of the invention are characterized by determining the OH number and the acid number. These characteristic numbers were determined by standard methods, for example described in E. Müller, Houben-Weyl, Methoden der organischen Chemie, Georg Thieme Verlag, Stuttgart 1963, Vol. 14/2, p. 17/18.

The molecular weights were determined by gel permeation chromatography (solvent: tetrahydrofuran, column material: PL-gel from Polymer Laboratories, GB-elution rate: 0.8 ml/min, temperature: 35° C.). The standard used was narrow-distribution polystyrene. Detection was effected with a UV detector at 254 nm.

EXAMPLES

Example 1

An apparatus suitable for carrying out polycondensations, which was heatable and equipped with a stirrer, a device for working under nitrogen and a stillhead, was charged with 600 g of polyethylene glycol having a number average molecular weight of 1500 and 88.0 g of succinic anhydride, followed by 0.86 g of p-toluenesulfonic acid monohydrate and 0.86 g of 50% strength aqueous phosphorus acid, and the contents were heated for 2 hours at 180° C. while stirring under nitrogen.

To this preproduct were then added 127 g of ethylene glycol and 132.8 g of terephthalic acid and the reaction mixture was heated up in stages to 245° C. under a stream of nitrogen. The water formed in the course of the polycondensation was distilled off via a column together with volatiles. Following a condensation time of 3 hours and of 4 hours, a further 10 g of ethylene glycol were added each time. After 5 hours the column was removed and sufficient water distilled off until the polycondensate had an acid number of 2. After 8.5 hours of condensation, excess ethylene glycol was distilled off under reduced pressure and the condensation continued for 1.5 hours at 1 mbar and 245° C.

The product obtained was a pale beige solid with a weight average molecular weight of 4100.

Example 2

Example 1 was repeated using 1.13 g of para-toluenesulfonic acid, 1.13 g of phosphorus acid (50% strength), 186 g of ethylene glycol and 265.6 g of terephthalic acid.

The product obtained was a pale beige solid with a weight average molecular weight of 17,800.

Example 3

Example 1 was repeated using 1.13 g of para-toluenesulfonic acid, 1.35 g of phosphorus acid (50% strength), 260.4 g of ethylene glycol and 398.4 g of terephthalic acid.

The product obtained was a pale beige solid with a weight average molecular weight of 14,700.

Example 4

Example 3 was repeated with the condensation phase at the end shortened to 1 hour.

The product obtained was a pale beige solid with a weight average molecular weight of 10,200.

Example 5

In the apparatus described in Example 1, 750 g of polyethylene glycol having a number average molecular weight of 4000, 41.3 g of succinic anhydride, 1.0 g of p-toluenesulfonic acid monohydrate and 1.0 g of 50% strength aqueous phosphorus acid were mixed and condensed at 245° C. under nitrogen for 2 hours. To this preproduct were then added 87.3 g of ethylene glycol and 124.5 g of terephthalic acid and the condensation was continued at the stated temperature while volatiles were distilled off via a column. Following a condensation time of 5 hours the column was removed and the distillation continued until the polycondensation product had an acid number of 3.5. Following a condensation time of 6 hours and of 8 hours a further 10 g of ethylene glycol were added each time. After a total of 10.5 hours the excess ethylene glycol was distilled off and the condensation continued at 145° C. and 1 mbar for 1.5 hours.

The product obtained was a pale beige hard solid with a weight average molecular weight of 8400.

Example 6

In the apparatus described in Example 1, 466.1 g of dimethyl terephthalate, 429.0 g of ethylene glycol and 0.90 g of tetrabutyl orthotitanate were precondensed at from 150° to 180° C. for 2 hours while methanol was distilled off and, subsequently, excess ethylene glycol was distilled off under reduced pressure. Following decompression with inert gas, 900 g of polyethylene glycol having a number average molecular weight of 1500 and 132 g of succinic anhydride were added, and the condensation was initially carried out at atmospheric pressure with a stepwise increase in temperature from 180° C. to 245° C. A vacuum was applied from an acid number of 23 and the condensation completed at 1 mbar over 4 hours.

The product obtained was a pale brown solid having a weight average molecular weight of 6800.

Example 7

Example 5 was repeated with 600 g of polyethylene glycol having a number average molecular weight 4000 being condensed with 33.0 g of succinic anhydride, 1.05 g of para-toluenesulfonic acid, 2.13 g of phosphorus acid (50% strength), 169 g of ethylene glycol and 265.6 g of terephthalic acid.

The product obtained was a pale brown solid with a weight average molecular weight of 12,400.

Example 8

Example 5 was repeated with 600 g of polyethylene glycol having a number average molecular weight 4000 being condensed with 33.0 g of succinic anhydride, 1.19 g of para-toluenesulfonic acid, 2.38 g of phosphorus acid (50% strength), 192.6 g of ethylene glycol and 348.6 g of terephthalic acid.

The product obtained was a pale brown solid with a weight average molecular weight of 13,100.

Example 9

In the apparatus described in Example 1, 600 g of polyethylene glycol having a number average molecular weight of 1500, 128.6 g of adipic acid, 1.39 g of p-toluenesulfonic acid monohydrate and 1.39 g of 50% strength aqueous phosphorus acid were mixed and heated under a stream of nitrogen to 180° C. for 2 hours while the water formed in the course of the condensation was distilled off. To this preproduct was then added 160.4 g of ethylene glycol and 398.4 g of terephthalic acid and the condensation was continued at 245° C. The volatiles were distilled off via a column. After 5 hours the column was removed and the reaction mixture was condensed with distillative removal of water until it had an acid number of 3.5, 10 g of diethylene glycol being added after 6 hours and after 8 hours. Following a condensation time of 10.5 hours the excess diethylene glycol was distilled off under reduced pressure.

The product obtained was a pale beige hard solid with a weight average molecular weight of 9700.

Example 10

Example 9 was repeated using 1.18 g of para-toluenesulfonic acid, 1.18 g of phosphorus acid (50% strength), 186 g of ethylene glycol and 265.6 g of terephthalic acid.

The product obtained was a colorless solid with a weight average molecular weight of 4300.

Example 11

Example 6 was repeated using 192.7 g of adipic acid instead of the succinic anhydride.

The product obtained was a pale brown solid with a weight average molecular weight of 8400.

The soil-release properties of the polymers were determined in a wash test. This was done by measuring the reflectance (instrument: Data color 2000) of the test fabrics ($R^1$) following 3-fold prewashing (Table 1 contains the washing conditions). The fabrics were then stained with used engine oil and the reflectance was determined 24 hours later ($R^2$). This was followed by a further wash before another reflectance measurement ($R^3$). The soil release S in % was calculated by the formula $S=(R^3-R^2)/(R^1-R^2)*100$.

TABLE 1

| Washing conditions | |
| --- | --- |
| Washing machine | Launder-o-meter |
| Detergent liquor | 250 ml |
| Detergent dose | 6 g/l |
| Wash time | 30 min |
| Wash temperature | 60° C. |
| Prewash cycle | 3 |
| Test fabrics | 10 g of cotton, 5 g of polyester-cotton, 5 g of polyester |
| Staining | 0.2 g of used engine oil on polyester |

Table 2 contains the composition of the test detergents used. The detergent formulations indicated in Table 2 included 1% of a polycondensate according to Example 11.

TABLE 2

| | Detergent formulations | | | | | | | | | |
| --- | --- | --- | --- | --- | --- | --- | --- | --- | --- | --- |
| | Composition % | | | | | | | | | |
| Formulation | 1 | 2 | 3 | 4 | 5 | 6 | 7 | 8 | 9 | 10 |
| Alkylbenzenesulfonic acid | 8.4 | 8.4 | 8.4 | 8.4 | — | — | — | — | — | — |
| Fatty alcohol sulfate ($C_{12}C_{14}$) | — | — | — | — | 8.4 | 8.4 | 8.4 | — | — | — |
| $C_{13}/C_{15}$ oxo alcohol + 7 ethylene oxide | 5.1 | 5.1 | 5.1 | 5.1 | 5.1 | 5.1 | 5.1 | 13.5 | 13.5 | 13.5 |
| Fatty acid, sodium salt | 1.4 | 1.4 | 1.4 | 1.4 | 1.4 | 1.4 | 1.4 | 1.4 | 1.4 | 1.4 |
| Sodium carbonate | 14.0 | — | — | — | 14.0 | — | — | 14.0 | — | — |
| Sodium perborate * 3 $H_2O$ | 21.0 | 21.0 | 21.0 | 21.0 | 21.0 | 21.0 | 21.0 | 21.0 | 21.0 | 21.0 |
| Sodium metasilicate * 5 $H_2O$ | 3.6 | 3.6 | 3.6 | 3.6 | 3.6 | 3.6 | 3.6 | 3.6 | 3.6 | 3.6 |
| Zeolite A | 30.0 | — | — | — | 30.0 | — | — | 30.0 | — | — |
| Sodium tripolyphosphate | — | 40.0 | — | — | — | 40.0 | — | — | 40.0 | — |
| Sheet-silicate (SKS6) | — | — | 30.0 | — | — | — | 30.0 | — | — | 30.0 |
| Amorphous silicate (Portil ® A) | — | — | — | 30.0 | — | — | — | — | — | — |
| Carboxymethylcellulose (60%) | 1.2 | 1.2 | 1.2 | 1.2 | 1.2 | 1.2 | 1.2 | 1.2 | 1.2 | 1.2 |
| Sokalan ® CP 5 [1]) (100%) | 5.8 | 5.8 | 5.8 | 5.8 | 5.8 | 5.8 | 5.8 | 5.8 | 5.8 | 5.8 |
| TAED [2]) | 6.0 | 6.0 | 6.0 | 6.0 | 6.0 | 6.0 | 6.0 | 6.0 | 6.0 | 6.0 |
| Sodium sulfate | 3.5 | 7.5 | 17.5 | 17.5 | 3.5 | 7.5 | 17.5 | 3.5 | 7.5 | 17.5 |

[1]) Copolymer of 70% acrylic acid and 30% maleic acid, molecular weight 60,000.
[2]) Tetraacetylethylenediamine The results in Table 3 show that in all cases a soil removal (S) of more than 80% takes place when polymer is used.

TABLE 3

Soil release $R^1$ = 81%

| Ex. | Comp. Ex. | Formulation | Polymer of Example 11 | $(R^2)$ stained | $(R^3)$ washed | S (%) |
|---|---|---|---|---|---|---|
| | 1 | 1 | — | 19.1 | 29.0 | 16.0 |
| 12 | | 1 | 1% by weight | 19.5 | 73.6 | 88.0 |
| | 2 | 2 | — | 19.6 | 24.4 | 7.8 |
| 13 | | 2 | 1% by weight | 19.3 | 71.3 | 84.3 |
| | 3 | 3 | — | 19.4 | 26.4 | 11.4 |
| 14 | | 3 | 1% by weight | 19.4 | 74.6 | 89.6 |
| | 4 | 4 | — | 18.9 | 27.4 | 13.7 |
| 15 | | 4 | 1% by weight | 19.7 | 73.6 | 87.9 |
| | 5 | 5 | — | 19.6 | 33.1 | 22.0 |
| 16 | | 5 | 1% by weight | 19.3 | 74.3 | 89.1 |
| | 6 | 6 | — | 19.2 | 23.3 | 6.6 |
| 17 | | 6 | 1% by weight | 18.9 | 70.9 | 83.7 |
| | 7 | 7 | — | 19.1 | 33.6 | 23.4 |
| 18 | | 7 | 1% by weight | 19.0 | 73.8 | 88.4 |
| | 8 | 8 | — | 19.1 | 44.6 | 41.2 |
| 19 | | 8 | 1% by weight | 18.9 | 78.6 | 96.1 |
| | 9 | 9 | — | 18.8 | 35.2 | 26.4 |
| 20 | | 9 | 1% by weight | 18.9 | 78.4 | 95.8 |
| | 10 | 10 | — | 19.0 | 44.3 | 40.8 |
| 21 | | 10 | 1% by weight | 21.0 | 79.2 | 97.0 |

The effectiveness of polymers was also tested in a branded detergent, Persil® color from Henkel KGaA. The test conditions chosen corresponded to the data of Table 1. Table 4 contains the respective amphiphilic block copolyesters tested and also the soil removal results. The amounts of polymer are based on the amounts of detergent used.

The wash results in Table 4 show that the soil removal is distinctly improved with the polymers prepared according to Examples 1 to 11.

TABLE 4

Soil removal in a branded detergent

| Example | Block polyester prepared according to Example | S (%) without polymer | S (%) with 1% of polymer |
|---|---|---|---|
| 22 | 1 | 34 | 79 |
| 23 | 2 | 34 | 91 |
| 24 | 3 | 36 | 86 |
| 25 | 4 | 39 | 69 |
| 26 | 5 | 36 | 85 |
| 27 | 6 | 39 | 77 |
| 28 | 7 | 42 | 60 |
| 29 | 8 | 42 | 90 |
| 30 | 9 | 42 | 64 |
| 31 | 10 | 42 | 90 |
| 32 | 11 | 42 | 92 |

We claim:

1. Amphiphilic polyester comprising interspersed blocks of (a) ester units derived from a polyalkylene glycol having a weight average molecular weight of from 500 to 7500 and an aliphatic dicarboxylic acid and/or a monohydroxymonocarboxylic acid and (b) ester units derived from an aromatic dicarboxylic acid and a polyhydric alcohol and having weight average molecular weights of from 1500 to 25,000.

2. The amphiphilic polyester as claimed in claim 1, wherein the weight ratio of ester units (a):(b) is within the range from 5:1 to 1:2.

3. A process for preparing the amphiphilic polyester of claim 1, which comprises polycondensing to prepare first (a) an oligomeric aliphatic polyester of a polyalkylene glycol having a weight average molecular weight of from 500 to 7500 with aliphatic dicarboxylic acids and/or a monohydroxymonocarboxylic acid, condensing in the presence of said oligomeric aliphatic polyester (b) an oligomeric aromatic polyester formed from an aromatic dicarboxylic acid and a polyhydric alcohol, or reversing the order of the condensation, condensing said oligomeric aromatic polyester (b) with said oligomeric aliphatic polyester (a).

4. A process as claimed in claim 3, wherein the weight ratio of (a):(b) is within the range from 3:1 to 1:1.

5. A detergent, comprising the amphiphilic polyester of claim 1 and a detergent.

6. A method of treating a fabric, comprising contacting a fabric with the amphiphilic polyester of claim 1.

7. A product formed by a process for preparing the amphiphilic polyester which comprises, polycondensing to prepare first (a) an oligomeric aliphatic polyester of a polyalkylene glycol having a weight average molecular weight of from 500 to 7500 with aliphatic dicarboxylic acids and/or a monohydroxymonocarboxylic acid, condensing in the presence of said oligomeric aliphatic polyester (b) an oligomeric aromatic polyester formed from an aromatic dicarboxylic acid and a polyhydric alcohol, or reversing the order of the condensation, condensing said oligomeric aromatic polyester (b) with said oligomeric aliphatic polyester (a).

* * * * *